Aug. 11, 1931.        G. KRIBS        1,818,337
ELECTRICAL PROTECTIVE SYSTEM
Filed Jan. 20, 1928
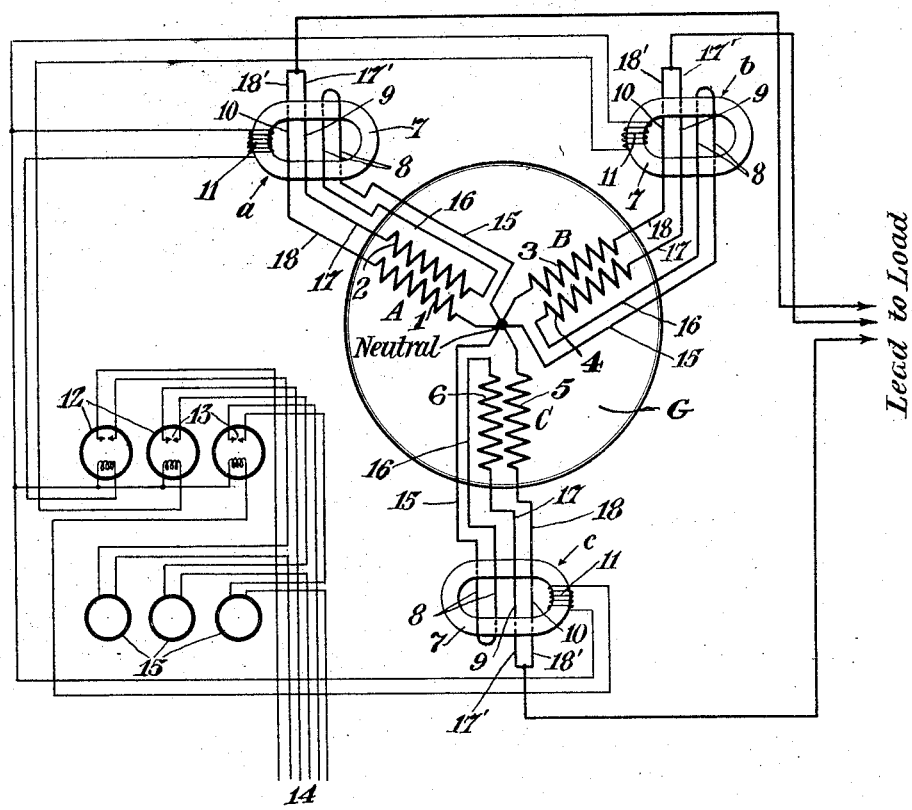
INVENTOR.
Gordon Kribs
BY
ATTORNEYS.

Patented Aug. 11, 1931

1,818,337

UNITED STATES PATENT OFFICE

GORDON KRIBS, OF NIAGARA FALLS, ONTARIO, CANADA

ELECTRICAL PROTECTIVE SYSTEM

Application filed January 20, 1928. Serial No. 248,182.

This invention relates to a system of protection for electrical apparatus and particularly for generators and the like. The object of the invention is to provide a simple, reliable system involving inexpensive equipment and acting in case of a ground or short circuit to open the circuit, disconnect the generator from the line or do whatever is desired to protect the apparatus involved.

A further object of the invention is to provide such a protective system which, while operating positively in case of failures within the apparatus to be protected, will not be falsely affected by anything external to this apparatus.

The accompanying drawing illustrates diagrammatically the invention as applied to a three phase generator.

In the system shown in the drawing a three phase generator G has its phase windings A, B, C each divided in two circuits separating the groups of coils in each phase into two equal parts making six separate paired windings designated 1, 2 and 3, 4 and 5, 6. There is a multiple primary current transformer $a$, $b$, $c$ for each phase which transformer has a laminated iron core 7 carrying four windings 8, 9, 10 and 11. 8 is a two-turn winding connected by conductors 15, 16 between the neutral point N and winding 2, 4 or 6. 9 and 10 are one-turn windings connected by wires 17, 17' and 18, 18' between the corresponding load lead and windings 1, 2 or 3, 4 or 5, 6.

The third winding 11 of each transformer $a$, $b$, $c$ is connected so as to feed a relay 12 and each winding 11 delivers current to its relay only when the ampere turns in windings 9 and 10 fail to neutralize the ampere turns in winding 8 due to a fault in the generator windings. Whenever there is a short circuit or ground or other fault within any phase disturbing the balance the ampere turns 8 and 9, 10 then a current will be induced in the corresponding secondary winding 11 to actuate its relay 12 by causing a closure of its contacts 13 and so allowing a source of voltage 14 to trip or otherwise operate the corresponding oil switch or other protective device 15. In this system the generator windings are divided into two circuits per phase with both ends of each winding brought out to terminals and the current in two of the transformer leads will pass around the core in one direction while the current in the other lead will pass twice around the core in the opposite direction. The current of the fourth lead does not pass through the transformer at all. Each pair of line leads are paralleled after passing the current transformer and all three pairs of neutral leads are paralleled after passing through the current transformer which is placed as near to the generator oil switch as possible in order to protect the generator leads as well as the generator proper.

The secondaries 11 of the current transformers being connected to the system of relays will trip the generator oil switch and operate such other appliances as may be desirable to protect the generator by disconnecting it from the line, closing it down, operating fire protection, closing off air supply, applying brakes, etc. This system will serve to protect the generator from all internal troubles such as grounds and short-circuits between phases, in place of the multiplicity of current transformers and relays formerly used to accomplish this result.

The system will also protect the generator against single turn shorts in a stator coil and is automatically self-balancing and is not affected by faults external to the equipment being protected. Owing to the above characteristic, and also to the fact that under normal conditions the flux in the iron core of the current transformer and consequently the current in its secondary is of negligible magnitude, the current transformer and accompanying relays can be made extremely sensitive without causing false operations under abnormal conditions, and therefore can be used to protect the generator from single turn short-circuits.

Furthermore, any condition of grounds or short circuit or mechanical unbalance in the field system of the generator tending to cause an unbalance between two sections of the same phase, will cause the relays to act and therefore protect the generator.

The principle of the invention is not confined to the specific embodiment shown in the drawing and various modifications may be resorted to.

As applied to the phase windings of a three phase generator the system of this invention provides three separate protective systems one for each phase. Each phase is thus independently protected irrespective of the other phases. While the invention has been illustrated and described in connection with the phase windings of an electrical generator, it is not confined thereto but may be similarly applied to other electrical apparatus such as transformers without departing from the scope of the invention set forth in the appended claims.

I claim:—

1. In an electrical protective system, a plurality of parallel connected windings adapted to be protected, a core member, a winding on said core member supplied with current from one end of said parallel connected windings, another winding on said core member supplied with current from the opposite end of said windings, said core windings being balanced to produce zero flux in said core under normal conditions of operation and to produce a flux in said core member under abnormal conditions of operation, and means for operating protective apparatus when said first named core windings produce a flux in said core.

2. In an electrical protective system, a plurality of parallel connected windings to be protected, a protective winding connected to one end of said plurality of windings, another protective winding connected to the other end of a portion of said protected windings, said two protective windings being positioned to produce opposing magneto-motive forces and having equal ampere turns under normal conditions in the apparatus, and means associated with said protective windings to protect said parallel windings when abnormal conditions produce unequal ampere turns in said protective windings.

3. In an electrical protective system the combination in multiphase apparatus having a plurality of phase windings each of which comprises a set of windings, of a series of separate windings one for each of said sets connected to one end of each corresponding set, another series of separate windings one for each of said sets connected to the other end of each corresponding set, said separate windings for each set being formed to balance to zero against each other under normal conditions in the corresponding set of phase windings and to unbalance under abnormal conditions in said set, and means actuated upon occurrence of said unbalanced condition for protecting said apparatus.

4. In an electrical protective system the combination in a multiphase apparatus having a plurality of phase windings each of which comprises a set of parallel windings, of a series of separate windings one for each of said sets connected to one end of the corresponding set, another series of separate windings one for each of said sets connected to the other end of each corresponding set, said separate windings for each set being formed to balance to zero against each other under normal conditions in the corresponding set of parallel windings and to unbalance only under abnormal conditions in said set, and means actuated upon occurrence of said unbalanced condition for protecting said apparatus.

5. An electrical protective system for a three phase generator comprising a set of parallel windings for each phase, a series of separate windings one for each of said sets connected to one end of each corresponding set, another series of separate windings one for each of said sets connected to the other end of each corresponding set, said separate windings for each set to be formed to balance to zero against each other under normal conditions in the corresponding set of phase windings and to unbalance only under abnormal conditions in said set, and means actuated upon occurrence of said unbalanced condition for protecting said generator.

GORDON KRIBS.